US010363788B2

(12) United States Patent
Reiser et al.

(10) Patent No.: US 10,363,788 B2
(45) Date of Patent: Jul. 30, 2019

(54) VIBRATION DAMPER FOR A VEHICLE

(71) Applicant: Bayerische Motoren Werke Aktiengesellschaft, Munich (DE)

(72) Inventors: Andreas Reiser, Munich (DE); Thomas Eifflaender, Munich (DE); Michael Keigler, Munich (DE); Johann Dudkowiak, Poecking (DE); Wolfgang Gruber, Landshut (DE); Matthias Stangl, Dachau (DE); Hubert Scholz, Munich (DE); Thomas Kaespaizer, Munich (DE); Martin Schwab, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 6 days.

(21) Appl. No.: 15/361,124

(22) Filed: Nov. 25, 2016

(65) Prior Publication Data

US 2017/0072757 A1 Mar. 16, 2017

Related U.S. Application Data

(63) Continuation of application No. PCT/EP2015/057687, filed on Apr. 9, 2015.

(30) Foreign Application Priority Data

May 27, 2014 (DE) .......................... 10 2014 210 096

(51) Int. Cl.
*B60G 13/08* (2006.01)
*F16F 9/42* (2006.01)
(Continued)

(52) U.S. Cl.
CPC ......... *B60G 13/008* (2013.01); *B60G 13/006* (2013.01); *B60G 13/08* (2013.01);
(Continued)

(58) Field of Classification Search
CPC .. B60G 13/005; B60G 13/006; B60G 13/008; B60G 13/08; B60G 2206/41;
(Continued)

(56) References Cited

U.S. PATENT DOCUMENTS 3,211,444 A * 10/1965 Avner ................. B60G 15/062
188/315
2004/0051271 A1 * 3/2004 Dean ...................... B60G 11/28
280/124.158
(Continued)

FOREIGN PATENT DOCUMENTS

CN 102729761 A 10/2012
DE 66 04 512 1/1970
(Continued)

OTHER PUBLICATIONS

German-language Search Report issued in counterpart German Application No. 10 2014 210 096.8 dated Jan. 30, 2015 with partial English translation (10 pages).
(Continued)

*Primary Examiner* — Keith J Frisby
(74) *Attorney, Agent, or Firm* — Crowell & Moring LLP

(57) ABSTRACT

A vibration damper is provided for a vehicle, preferably for a motor vehicle, having a wheel carrier made of metal for rotatably receiving a wheel, a damper tube arrangement at least partly made of a fiber-reinforced plastic for forming a damper fluid volume, a piston which is guided in the damper tube arrangement and includes a piston rod. The damper tube arrangement is rigidly connected to the wheel carrier and the piston rod can be connected to a body of the vehicle. A wheel carrier fluid volume is formed in the wheel carrier and which is connected to the damper fluid volume. The fluid in the wheel carrier fluid volume is in direct contact with the metal of the wheel carrier in order to transfer heat.

13 Claims, 5 Drawing Sheets

(51) Int. Cl.
*F16F 9/16* (2006.01)
*B60G 13/00* (2006.01)
*F16F 9/32* (2006.01)

(52) U.S. Cl.
CPC .............. *F16F 9/16* (2013.01); *F16F 9/3235* (2013.01); *F16F 9/3242* (2013.01); *F16F 9/42* (2013.01); *B60G 2202/24* (2013.01); *B60G 2204/129* (2013.01); *B60G 2206/41* (2013.01); *B60G 2206/50* (2013.01); *B60G 2206/71* (2013.01); *B60G 2206/7101* (2013.01)

(58) Field of Classification Search
CPC ........ B60G 2206/50; B60G 2206/7101; B60G 2206/71; B60G 2204/129; B60G 2202/24; B60G 15/07; F16F 9/42; F16F 9/3242; F16F 9/3235; F16F 9/16; B62D 7/18
USPC .................................................... 280/124.16
See application file for complete search history.

(56) References Cited

U.S. PATENT DOCUMENTS

| | | |
|---|---|---|
| 2005/0057015 A1 | 3/2005 | Frantzen et al. |
| 2011/0056785 A1 | 3/2011 | Marquar et al. |
| 2012/0247888 A1 | 10/2012 | Chikuma et al. |
| 2016/0031282 A1 | 2/2016 | Hernette et al. |

FOREIGN PATENT DOCUMENTS

| | | | |
|---|---|---|---|
| DE | 32 13 657 A1 | 11/1982 | |
| DE | 42 32 136 A1 | 3/1994 | |
| DE | 4409571 A1 * | 5/1995 | ............... B60G 3/20 |
| DE | 103 18 537 B4 | 3/2006 | |
| DE | 10 2009 029 299 A1 | 3/2011 | |
| DE | 10 2011 084 475 A1 | 4/2013 | |
| DE | 102011084475 A1 * | 4/2013 | ........... B60G 13/005 |
| DE | 10 2013 215 236 A1 | 2/2015 | |
| EP | 1 512 610 A1 | 3/2005 | |
| FR | 1 517 711 | 3/1968 | |
| FR | 2 473 961 | 7/1981 | |
| FR | 2473961 A1 * | 7/1981 | |
| FR | 2 696 223 A1 | 4/1994 | |
| JP | 2010-69962 A | 4/2010 | |
| WO | WO 2014/128131 A1 | 8/2014 | |

OTHER PUBLICATIONS

International Search Report (PCT/ISA/210) issued in PCT Application No. PCT/EP2015/057687 dated Jul. 23, 2015 with English translation (8 pages).

German-language Written Opinion (PCT/ISA/237) issued in PCT Application No. PCT/EP2015/057687 dated Jul. 23, 2015 (6 pages).

Chinese-language Office Action issued in counterpart Chinese Application No. 201580010652.6 dated Apr. 6, 2017 with English translation (Nine (9) pages).

* cited by examiner

VIBRATION DAMPER FOR A VEHICLE

CROSS REFERENCE TO RELATED APPLICATIONS

This application is a continuation of PCT International Application No. PCT/EP2015/057687, filed Apr. 9, 2015, which claims priority under 35 U.S.C. § 119 from German Patent Application No. 10 2014 210 096.8, filed May 27, 2014, the entire disclosures of which are herein expressly incorporated by reference.

BACKGROUND AND SUMMARY OF THE INVENTION

The present invention relates to a vibration damper for a vehicle, in particular for a motor vehicle.

German patent document DE 10 318 537 B4 describes a conventional attachment of a damper cylinder to a wheel carrier, which attachment is provided by screw and clamping connections.

German patent document DE 10 2011 084 475 A1 describes an integral pivot bearing made of cast aluminum. Here, both the damper integrated in the pivot bearing and the pivot bearing itself are formed from cast aluminum.

German patent document DE 10 2009 029 299 A1 describes an arrangement which is produced completely from fiber-reinforced plastic. Here, both the wheel carrier and the damper are produced from fiber-reinforced plastic. Both components are integrally bonded to one another.

The object of the present invention is to provide a vibration damper for a vehicle which, with economical production and simple assembly, is very lightweight and can be operated in a durable manner.

This and other objects are achieved by a vibration damper for a vehicle, preferably for a motor vehicle, comprising a wheel carrier made of metal for rotatably receiving a wheel, a damper tube arrangement made at least in part of fiber-reinforced plastic for forming a damper fluid volume, and a piston guided in the damper tube arrangement. The piston has a piston rod, wherein the damper tube arrangement is fixedly connected to the wheel carrier, and wherein the piston rod can be connected to a body of the vehicle. A wheel carrier fluid volume is formed in the wheel carrier and is connected to the damper fluid volume. The fluid in the wheel carrier fluid volume is in direct contact with the metal of the wheel carrier for a transfer of heat.

Within the scope of the invention it has been found that although the complete construction of the wheel carrier and of the damper tube arrangement from fiber-reinforced plastic is very lightweight, the heat produced in the damper cannot be dissipated very effectively. Furthermore, it should be noted that the complete construction of the vibration damper from metal material is very heavy. The conventional connection of the damper tubes to the wheel carrier via screw-connection interfaces also leads to additional weight and assembly effort.

In accordance with the invention, a vibration damper for a vehicle which includes a wheel carrier made of metal is therefore provided. The wheel carrier serves to rotatably receive the wheel. A wheel bearing is provided in or on the wheel carrier, accordingly. Furthermore, the vibration damper includes a damper tube arrangement. The damper tube arrangement is at least partly made of fiber-reinforced plastic. The damper tube arrangement provides a damper fluid volume. In particular, oil is used as fluid. A piston is guided in the damper tube arrangement. The piston is connected to a piston rod. The piston moves in the damper fluid volume. The damper tube arrangement is fixedly connected via its lower end to the wheel carrier. The piston rod constitutes a connection to the body of the vehicle. In addition to the damper fluid volume in the damper tube arrangement, a wheel carrier fluid volume is formed directly in the wheel carrier. The fluid, in particular the oil, in the wheel carrier fluid volume is connected to the damper fluid volume so that, in particular by way of movement of the piston, there is an exchange of fluid between the damper fluid volume and the wheel carrier fluid volume. The fluid in the wheel carrier fluid volume is in direct contact with the metal of the wheel carrier. A transfer of heat from the fluid to the metal wheel carrier is thus ensured.

By means of the at least partial formation of the damper tube arrangement from fiber-reinforced plastic, the potential for a lightweight construction is fully exploited. In order to also, at the same time, dissipate the heat produced in the fluid, the wheel carrier fluid volume is provided. The full mass of the wheel carrier can thus be used for dissipation of the heat.

The wheel carrier is preferably formed as a pivot bearing. The pivot bearing is a relatively bulky component, which constitutes a direct connection of the wheel bearing to the body. The pivot bearing thus combines the functions of the wheel carrier and the attachment of the wheel carrier to the body. In particular, this bulky component can be effectively used for the dissipation of the heat from the fluid.

The damper tube arrangement is preferably open at the end face so that the damper fluid volume transitions directly into the wheel carrier fluid volume. The end face of the damper tube arrangement can also be referred to as the base. This base of the damper tube arrangement is therefore open. The base of the vibration damper is therefore formed by the metal material of the wheel carrier. In particular, heat is thus transferred via the base.

Provision is furthermore preferably made for the wheel carrier fluid volume to constitute an extension of the damper tube arrangement so that the piston, depending on position, is moved through the damper fluid volume or the wheel carrier fluid volume. Not only the base, but also a cylindrical wall region of the vibration damper is therefore formed by the metal material of the wheel carrier, whereby the surface for heat transfer is enlarged.

Provision is furthermore preferably made for the vibration damper to include a base valve. A base valve of this type is used both in the case of a two-tube damper principle and in the case of a single-tube damper principle. This base valve is preferably arranged in the wheel carrier fluid volume, that is to say within the wheel carrier.

In accordance with a first preferred variant, a two-tube damper principle is applied. Accordingly, the damper tube arrangement comprises an outer tube and an inner tube. A compensation fluid volume is formed between the outer tube and the inner tube. The fluid can flow from the inner tube into the compensation fluid volume via the base valve. The inner tube advantageously protrudes further into the wheel carrier than the outer tube. In the region of the damper fluid volume, an outer wall of the compensation fluid volume is formed by the outer tube. In the region of the wheel carrier, the metal material of the wheel carrier itself forms the outer wall of the compensation fluid volume.

In accordance with a second preferred variant, a single-tube damper principle is used. Accordingly, the damper tube arrangement comprises just one individual tube. A compensation fluid volume is likewise required also in the case of use of the individual tube. In this arrangement as well, a base valve is preferably used, wherein the fluid can flow into the compensation fluid volume via the base valve. Provision is preferably made within the scope of the invention for this compensation fluid volume to be formed in the wheel carrier so that, in the compensation fluid volume, the fluid is in direct contact with the metal material of the wheel carrier. In particular, there are fluid channels below the base valve, which connect the wheel carrier fluid volume to the compensation fluid volume.

Cooling ribs are preferably arranged in the compensation fluid volume, wherein the cooling ribs are integral parts of the metal wheel carrier. These cooling ribs can be used both in the case of this single-tube damper principle and in the case of the two-tube damper principle. The cooling ribs significantly increase the surface areas for heat transfer.

Provision is preferably furthermore made for the outer tube (in the case of the two-tube damper principle) or for the individual tube (in the case of the single-tube damper principle) to be adhesively bonded to the wheel carrier.

In order to form the wheel carrier fluid volume, a blind bore or an accordingly shaped pocket is preferably formed in the wheel carrier. The damper tube arrangement is preferably inserted into this pocket or bore.

For the at least partial construction of the damper tube arrangement from fiber-reinforced plastic, a number of preferred variants are provided: provision is made for the inner tube, the outer tube and/or the individual tube to be made either completely of fiber-reinforced plastic or for a metal tube or plastic tube to be used, around which there is wound a fiber-composite material. Here, the metal or plastic tube serves in particular to guide the piston and is so weak that it is not durable without the external winding made of fiber-composite material. In particular, a fiber-reinforced plastic is wound around the metal or plastic tube.

In the case of the embodiment as the two-tube damper principle, it is also possible to form merely the outer tube at least partly in a fiber-reinforced manner and to use a tube made completely of metal for the inner tube.

In particular, with use of the above-described compensation fluid volume, provision is made for a compressible medium, in particular gas, for example air, to be arranged in the compensation fluid volume.

The used piston has a certain cross-sectional area, which corresponds substantially to the cross-sectional area of the inner tube or of the individual tube. The design of the wheel carrier with the wheel carrier fluid volume and the advantageous compensation fluid volume within the wheel carrier provides a certain heat transfer area, over which the fluid is in direct contact with the metal material of the wheel carrier. Provision is advantageously made for the heat transfer area to correspond to at least 150%, advantageously at least 200%, particularly advantageously at least 300% of the defined cross-sectional area of the tube. A sufficient heat-transfer area for the dissipation of heat from the fluid, in particular the oil, is thus provided.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
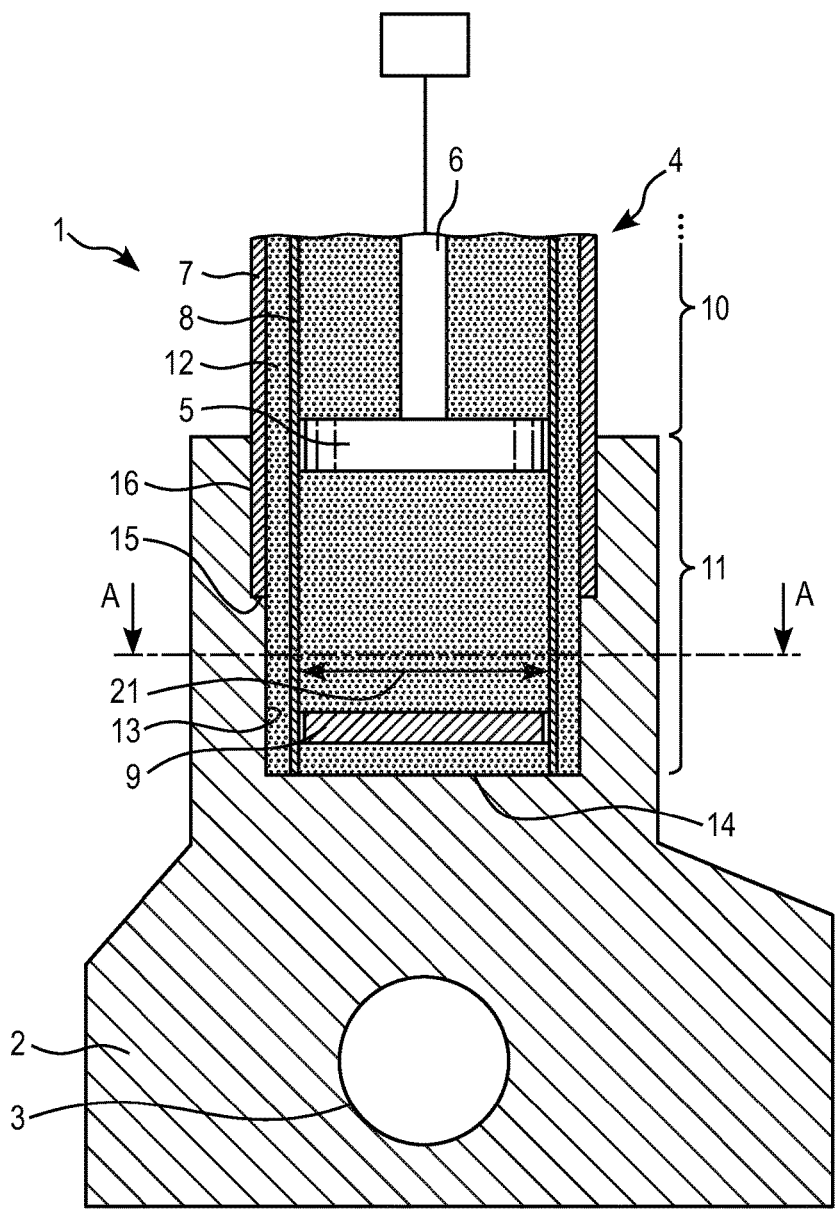
FIGS. 1A and 1B are cross-sectional views of a vibration damper according to the invention in accordance with a first exemplary embodiment.

Three exemplary embodiments of a vibration damper 1 will be explained hereinafter on the basis of FIGS. 1 to 4. Like or functionally alike components are provided in all exemplary embodiments with the same reference signs. The illustrations in the drawings are schematically simplified and show merely the components relevant to the invention.

The vibration damper 1 according to FIG. 1A comprises a wheel carrier 2. The wheel carrier 2 is made of metal, in particular die-cast aluminum. The wheel carrier 2 serves to rotatably receive a wheel of a vehicle, in particular of a motor vehicle. A wheel bearing 3 is therefore arranged in or on the wheel carrier 2. The wheel carrier 2 is, in particular, formed as a pivot bearing of a front axle.

The vibration damper 1 further comprises a damper tube arrangement 4 having a piston 5. The piston 5 is connected to a piston rod 6. A lower end of the damper tube arrangement 4 is fixedly connected to the wheel carrier 2. The piston rod 6 is connected to a body of the vehicle.

In the first exemplary embodiment what is known as the two-tube damper principle is shown. For this purpose, the damper tube arrangement 4 comprises an outer tube 7 and an inner tube 8. The piston 5 is guided in the inner tube 8.

The outer tube 7 is made of fiber-reinforced plastic. The inner tube 8 is made of metal.

A base valve 9 is disposed in the lower region of the inner tube 8. The damper tube arrangement 4 projects into a pocket of the wheel carrier 2. The base valve 9 is thus disposed within the wheel carrier 2.

The damper tube arrangement 4 outside the wheel carrier 2 constitutes a damper fluid volume 10. Within the wheel carrier 2, this damper fluid volume 10 transitions into a wheel carrier fluid volume 11. Depending on the actual position, the piston 5 moves in the damper fluid volume 10 or in the wheel carrier fluid volume 11. The fluid, in particular oil, in the wheel carrier fluid volume 11 is in direct contact with the metal surface of the wheel carrier 2, whereby a very good exchange of heat takes place.

The inner tube 8 is distanced from the outer tube 7, whereby a compensation fluid volume 12 is produced between the inner tube 8 and the outer tube 7. The inner tube 8 projects further into the wheel carrier 2 than the outer tube 7. The outer surface of the compensation fluid volume 12 is thus formed in part by the outer tube 7 and in part by the material of the wheel carrier 2. The compensation fluid volume 12 is partially part of the damper fluid volume 10, specifically outside the wheel carrier 2, and partially part of the wheel carrier fluid volume 11, specifically within the wheel carrier 2. In this exemplary embodiment the fluid is in direct contact with the wheel carrier 2 both via the base 14 and via the outer wall 13 of the compensation fluid volume 12.

The fluid flows into the compensation fluid volume 12 and out from the compensation fluid volume 12 via the base valve 9 in the wheel carrier fluid volume 11. This is necessary since, as the piston 5 moves, fluid is displaced by the piston rod 6.

An annular step 15 is formed in the wheel carrier 2. The outer tube 7 rests on this annular step 15. An adhesive bond 16 is also provided between the outer tube 7 and the wheel carrier 2.

Figure 1B:
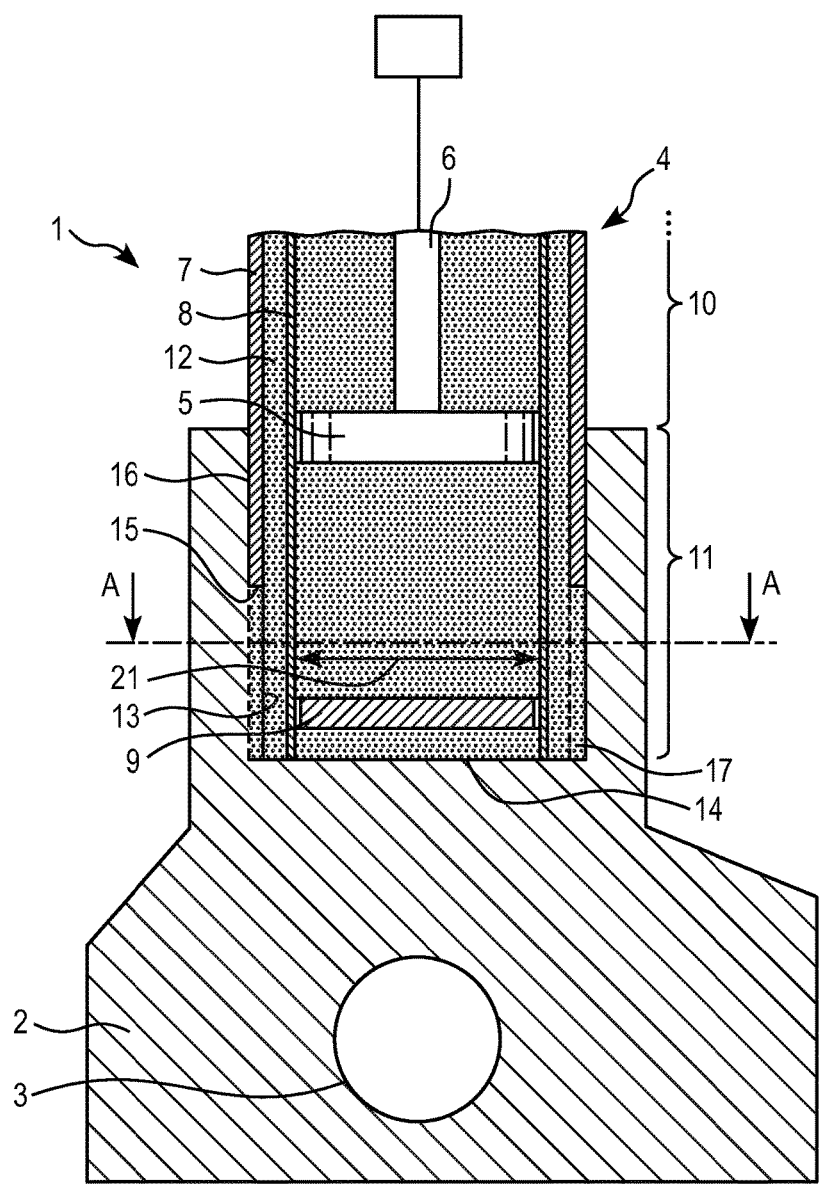
Figure 2A:
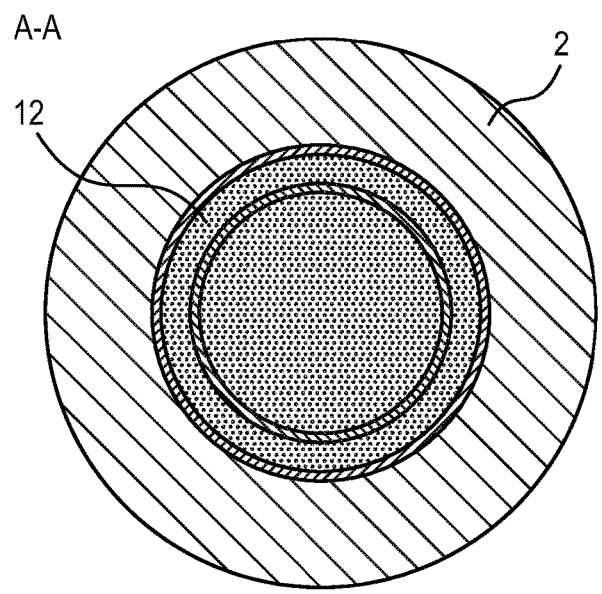
FIGS. 2A and 2B show the sectional view A-A indicated in FIG. 1.
Figure 2B:
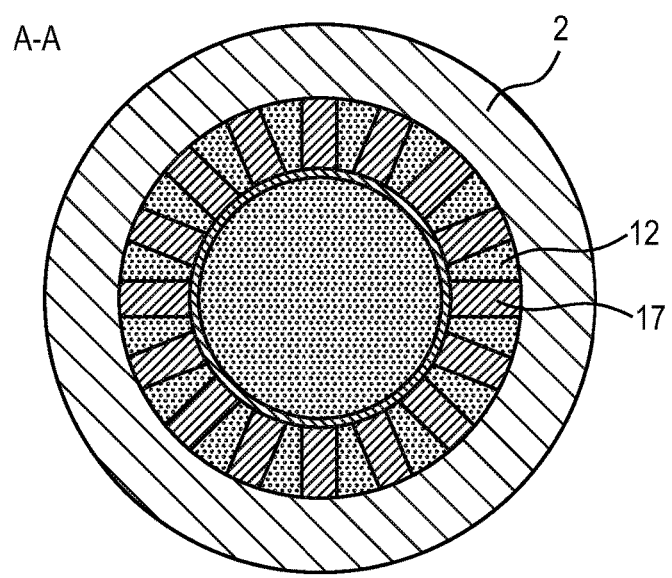

FIG. 1B shows a variant of the first exemplary embodiment. In this variant, cooling ribs 17 are provided in the compensation fluid volume 12. In particular, the section A-A in FIG. 2B shows the design of the cooling ribs 17. The cooling ribs 17 are integral parts of the wheel carrier 2 and are therefore also made of metal. The heat-transfer area is decidedly increased by the cooling ribs 17.

Figure 3:
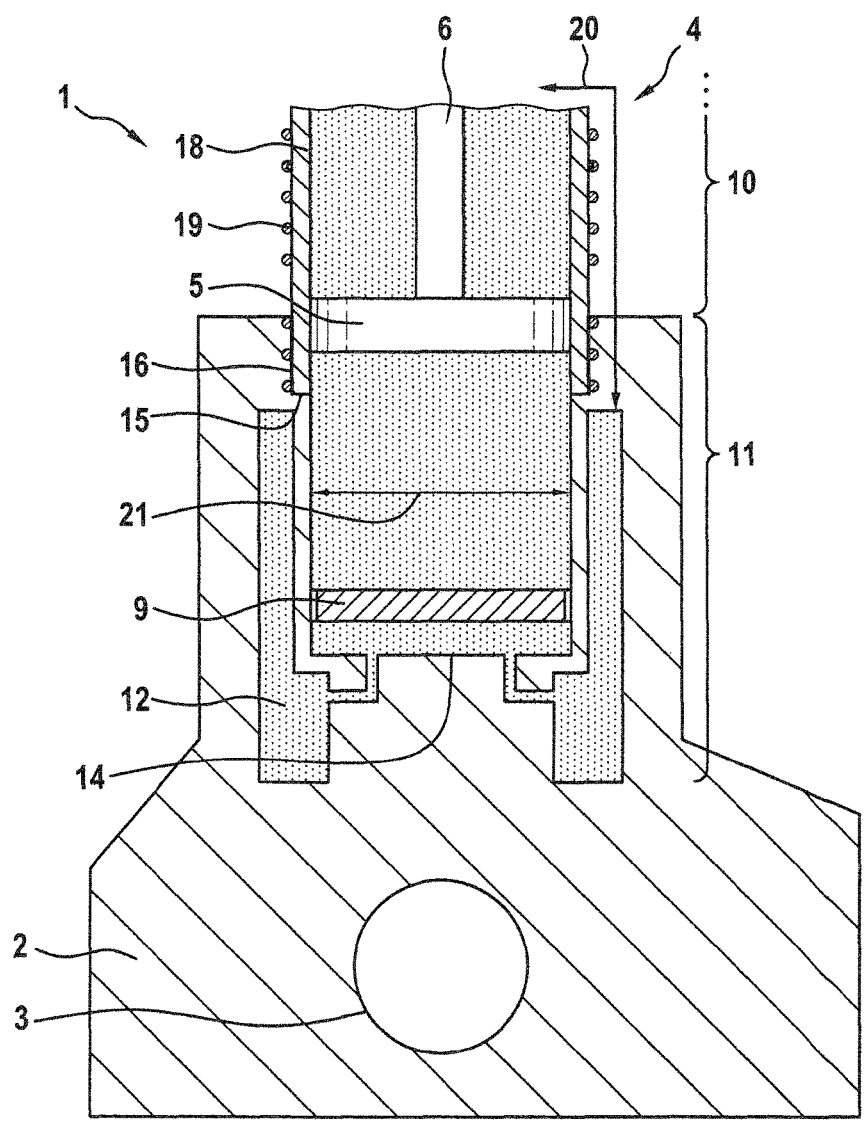
FIG. 3 is a cross-sectional view of a vibration damper according to the invention in accordance with a second exemplary embodiment.

FIG. 3 shows the vibration damper 1 in accordance with the second exemplary embodiment, formed in accordance with the single-tube damper principle.

The damper tube arrangement 4 here comprises an individual tube 18. The individual tube 18 rests in the wheel carrier 2 on the annular step 15. The damper fluid volume 10 again transitions directly into the wheel carrier fluid volume 11, whereby the piston 5, depending on position, moves in the damper fluid volume 10 or in the wheel carrier fluid volume 11.

In the wheel carrier fluid volume 11 the fluid is in direct contact with the metal of the wheel carrier 2 not only at the base 14, but also at the cylindrical wall surface.

The compensation fluid volume 12 is formed in the second exemplary embodiment by forming separate cavities in the wheel carrier 2. A ventilation channel 20 for this cavity is preferably provided.

The compensation fluid volume 12 extends in the second exemplary embodiment both in part below the base 14 and to the side of the wheel carrier fluid volume 11.

Figure 4:
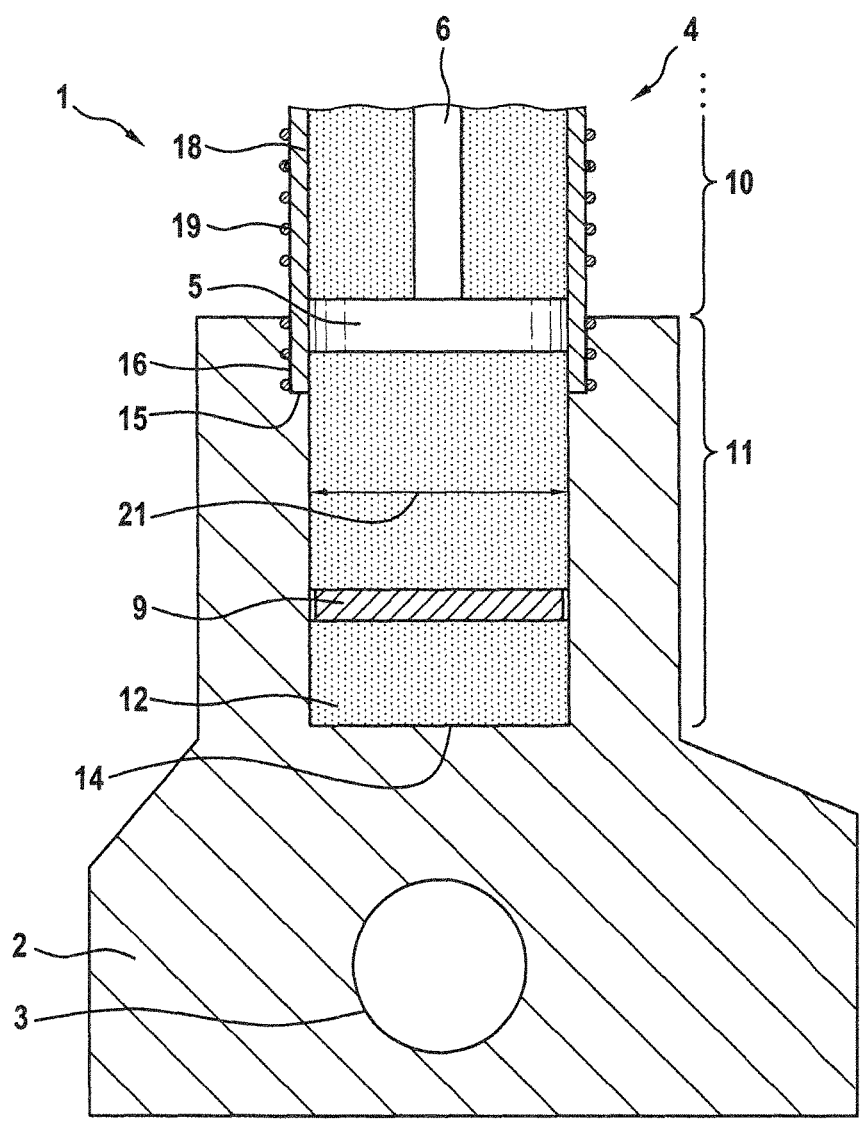
FIG. 4 is a cross-sectional view of a vibration damper according to the invention in accordance with a third exemplary embodiment.

FIG. 4, with the third exemplary embodiment, shows a simpler embodiment of the compensation fluid volume 12. A bore with uniform diameter is provided in the wheel carrier 2 in the third exemplary embodiment. This bore is divided by the base valve 9 into the chamber in which the piston 5 moves and the compensation fluid volume 12 arranged therebelow.

In the second and third exemplary embodiment, the inner tube 18 is formed by a metal tube or plastic tube, around which there is again wound a fiber-composite material. However, the individual tube 18 can also be made completely from fiber-reinforced plastic in the second or third exemplary embodiment.

Equally, provision is made in the first exemplary embodiment for the outer tube 7 to be made not from pure fiber-reinforced plastic, but for a metal or plastic tube to be used in this case as well, around which there is again wound a fiber composite. The inner tube 8 according to the first exemplary embodiment can instead be made of metal, plastic, or fiber-reinforced plastic.

As shown by the three exemplary embodiments, a certain heat transfer area is always provided by the formation of the wheel carrier fluid volume 11 directly in the wheel carrier 2, at which heat transfer area the fluid is in direct contact with the metal material. The drawings show a diameter 21 of the piston 5. A cross-sectional area of the piston 5 is calculated in accordance with this diameter 21. The heat transfer area within the wheel carrier 2 advantageously corresponds to at least 150% of this cross-sectional area.

To summarize, it should be noted that, by means of the vibration damper according to the invention in hybrid design, specifically composed of metal and plastic, and by means of the resultant omission of screw-connection interfaces, a very lightweight arrangement is produced. Furthermore, due to the omission of the outer tube 7 and therefore a use of an individual tube damper principle, significant installation space and weight can be saved. The conventional problem of heat dissipation arising in the case of fiber-composite design is solved by the local cooling within the wheel carrier 2, in particular in the region of the base valve. A further advantage results from the significant cost savings caused by the omission of pre-assembly steps.

LIST OF REFERENCE SIGNS 1 vibration damper
2 wheel carrier
3 wheel bearing
4 damper tube arrangement
5 piston
6 piston rod
7 outer tube
8 inner tube
9 base valve
10 damper fluid volume
11 wheel carrier fluid volume
12 compensation fluid volume
13 outer wall
14 base
15 step
16 adhesive bond
17 cooling ribs
18 individual tube
19 external winding
20 ventilation channel
21 diameter The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vibration damper for a vehicle, comprising:
   a wheel carrier, made of metal, that rotatably receives a wheel;
   a damper tube arrangement, made at least in part of fiber-reinforced plastic, which is fixedly connected to the wheel carrier, wherein the damper tube arrangement outside of the wheel carrier forms a damper fluid volume;
   a piston guided in the damper tube arrangement, the piston having a piston rod, wherein the piston rod is connectable to a body of the vehicle;
   wherein the damper tube arrangement is open at an end face so that the damper fluid volume transitions directly into a wheel carrier fluid volume within the wheel carrier so that
   fluid in the wheel carrier fluid volume is in direct contact with the metal of the wheel carrier in order to transfer heat; and
   a base valve, separate from the piston, disposed within the wheel carrier.

2. The vibration damper according to claim 1, wherein the wheel carrier fluid volume constitutes an extension of the damper tube arrangement so that the piston, depending on position, is moved through the damper fluid volume or the wheel carrier fluid volume.

3. The vibration damper according to claim 1, wherein the damper tube arrangement comprises only one individual tube, and at least one compensation fluid volume is formed in the wheel carrier, the fluid for the heat transfer is in direct contact with the metal of the wheel carrier in the compensation fluid volume.

4. The vibration damper according to claim 3, further comprising:
cooling ribs are arranged in the compensation fluid volume, wherein the cooling ribs are integral parts of the wheel carrier.

5. The vibration damper according to claim 3, wherein the individual tube is adhesively bonded to the wheel carrier.

6. The vibration damper according to claim 3, wherein the individual tube is:
made completely of fiber-reinforced plastic,
a metal tube around which is wound fiber-composite material, or
a plastic tube around which is wound fiber-composite material.

7. The vibration damper according to claim 1, wherein the vibration damper is a motor vehicle vibration damper.

8. The vibration damper according to claim 1, wherein a cylindrical wall region of the vibration damper is formed by the metal of the wheel carrier.

9. A vibration damper for a vehicle, comprising:
a wheel carrier, made of metal, that rotatably receives a wheel;
a damper tube arrangement, made at least in part of fiber-reinforced plastic, that forms a damper fluid volume;
a piston guided in the damper tube arrangement, the piston having a piston rod and the damper tube arrangement being fixedly connected to the wheel carrier, wherein the piston rod is connectable to a body of the vehicle;
a wheel carrier fluid volume, the wheel carrier fluid volume being formed in the wheel carrier and being connected to the damper fluid volume, wherein
fluid in the wheel carrier fluid volume is in direct contact with the metal of the wheel carrier in order to transfer heat,
wherein at least one tube of the damper tube arrangement is shorter than a maximum damper path of the piston.

10. A vibration damper for a vehicle, comprising:
a wheel carrier, made of metal, that rotatably receives a wheel;
a damper tube arrangement, made at least in part of fiber-reinforced plastic, that forms a damper fluid volume;
a piston guided in the damper tube arrangement, the piston having a piston rod and the damper tube arrangement being fixedly connected to the wheel carrier, wherein the piston rod is connectable to a body of the vehicle;
a wheel carrier fluid volume, the wheel carrier fluid volume being formed in the wheel carrier and being connected to the damper fluid volume, wherein
fluid in the wheel carrier fluid volume is in direct contact with the metal of the wheel carrier in order to transfer heat,
wherein the damper tube arrangement comprises an outer tube and an inner tube,
a compensation fluid volume is formed between the outer tube and the inner tube, and
the inner tube extends further into the wheel carrier than the outer tube so that an outer wall of the compensation fluid volume is formed, in part, by the wheel carrier.

11. The vibration damper according to claim 10, further comprising:
cooling ribs arranged in the compensation fluid volume, wherein
the cooling ribs are integral parts of the wheel carrier.

12. The vibration damper according to claim 10, wherein the outer tube is adhesively bonded to the wheel carrier.

13. The vibration damper according to claim 10, wherein one or more of the inner tube and the outer tube are:
made completely of fiber-reinforced plastic,
metal tubes around which are wound fiber-composite material, or
plastic tubes around which are wound fiber-composite material.

* * * * *